United States Patent
Suit

(10) Patent No.: US 9,436,496 B1
(45) Date of Patent: *Sep. 6, 2016

(54) DYNAMIC VIRTUAL STORAGE CREATION AND PROVISIONING OF VIRTUAL MACHINE RESOURCES

(71) Applicant: OPEN INVENTION NETWORK LLC, Durham, NC (US)

(72) Inventor: John Michael Suit, Mount Airy, MD (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,159

(22) Filed: Oct. 13, 2015

Related U.S. Application Data

(63) Continuation of application No. 13/552,898, filed on Jul. 19, 2012, now Pat. No. 9,158,940.

(60) Provisional application No. 61/509,192, filed on Jul. 19, 2011.

(51) Int. Cl.
*G06F 17/30* (2006.01)
*G06F 7/00* (2006.01)
*G06F 9/455* (2006.01)
*G06F 3/06* (2006.01)

(52) U.S. Cl.
CPC ......... *G06F 9/45558* (2013.01); *G06F 3/0607* (2013.01); *G06F 3/0631* (2013.01); *G06F 3/0665* (2013.01); *G06F 3/0689* (2013.01); *G06F 17/30566* (2013.01); *G06F 2009/45583* (2013.01)

(58) Field of Classification Search
USPC .......................................................... 707/803
See application file for complete search history.

(56) References Cited

U.S. PATENT DOCUMENTS

| | | | |
|---|---|---|---|
| 2005/0166011 A1* | 7/2005 | Burnett et al. ................ | 711/112 |
| 2009/0144499 A1* | 6/2009 | Nicholson et al. ........... | 711/118 |
| 2009/0198946 A1* | 8/2009 | Ebata ............................ | 711/171 |
| 2010/0036863 A1* | 2/2010 | Koifman et al. ............. | 707/101 |
| 2010/0229185 A1* | 9/2010 | Howarth ....................... | 719/318 |

* cited by examiner

Primary Examiner — Kuen Lu
(74) Attorney, Agent, or Firm — Haynes and Boone, LLP

(57) ABSTRACT

A method and apparatus are disclosed of identifying a virtual machine usage of enterprise network resources, such as memory storage usage. One example method of operation may include transmitting a storage request to a database to determine an amount of physical memory storage available in the enterprise network. The method may also include receiving an alert message indicating a virtual machine currently operating has exceeded a predetermined memory storage threshold value. The method may also include creating a new virtual hard disk (VHD) to accommodate the exceeded predetermined memory storage threshold value.

18 Claims, 4 Drawing Sheets

DYNAMIC VIRTUAL STORAGE CREATION AND PROVISIONING OF VIRTUAL MACHINE RESOURCES

CROSS-REFERENCE TO RELATED APPLICATIONS

This application is a continuation of application Ser. No. 13/552,898, entitled "DYNAMIC VIRTUAL STORAGE CREATION AND PROVISIONING OF VIRTUAL MACHINE RESOURCES", filed on Jul. 19, 2012, now issued U.S. Pat. No. 9,158,940, issued on Oct. 13, 2015, which claims the benefit to provisional application 61/509,192, entitled "SYSTEM AND METHOD FOR DYNAMIC VIRTUAL STORAGE CREATION AND PROVISIONING", filed on Jul. 19, 2011, the entire contents of which are hereby incorporated by reference.

TECHNICAL FIELD OF THE INVENTION

The present invention is generally related to a system, method and device configured to dynamically determine and allocate resources between physical and virtual machines operating in an enterprise network environment.

BACKGROUND OF THE INVENTION

Currently, traditional enterprise networks may include various nodes that contribute to an overall business process. The network nodes may include both physical and virtual machines. Enterprise networks may include virtual machines and physical hosts, which are required to provide an allocation of resources.

Enterprise networks may include virtual machines and physical host devices which are required to provide an allocation of resources. Physical hosts may include hardware devices that provide certain services, such as physical storage, which may be converted to virtual storage and allocated to corresponding virtual machines depending on the anticipated requirements of an observed use of such virtual machines. The balance between actual physical storage and allocated virtual storage usage may be optimized by monitoring and identifying the activities performed by one or more virtual machines operating in the enterprise network environment.

SUMMARY OF THE INVENTION

An example embodiment of the present invention may include a method of transmitting a storage request to a database to determine an amount of physical memory storage available in an enterprise network and receiving an alert message indicating at least one virtual machine currently operating has exceeded a predetermined memory storage threshold value. The method may also include creating, via a processor, at least one new virtual hard disk (VHD) to accommodate the exceeded predetermined memory storage threshold value.

Another example embodiment of the present invention may include an apparatus that includes a transmitter configured to transmit a storage request to a database to determine an amount of physical memory storage available in an enterprise network. The apparatus may also include a receiver configured to receive an alert message indicating at least one virtual machine currently operating has exceeded a predetermined memory storage threshold value and a processor configured to create at least one new virtual hard disk (VHD) to accommodate the exceeded predetermined memory storage threshold value.

DETAILED DESCRIPTION

Figure 1:
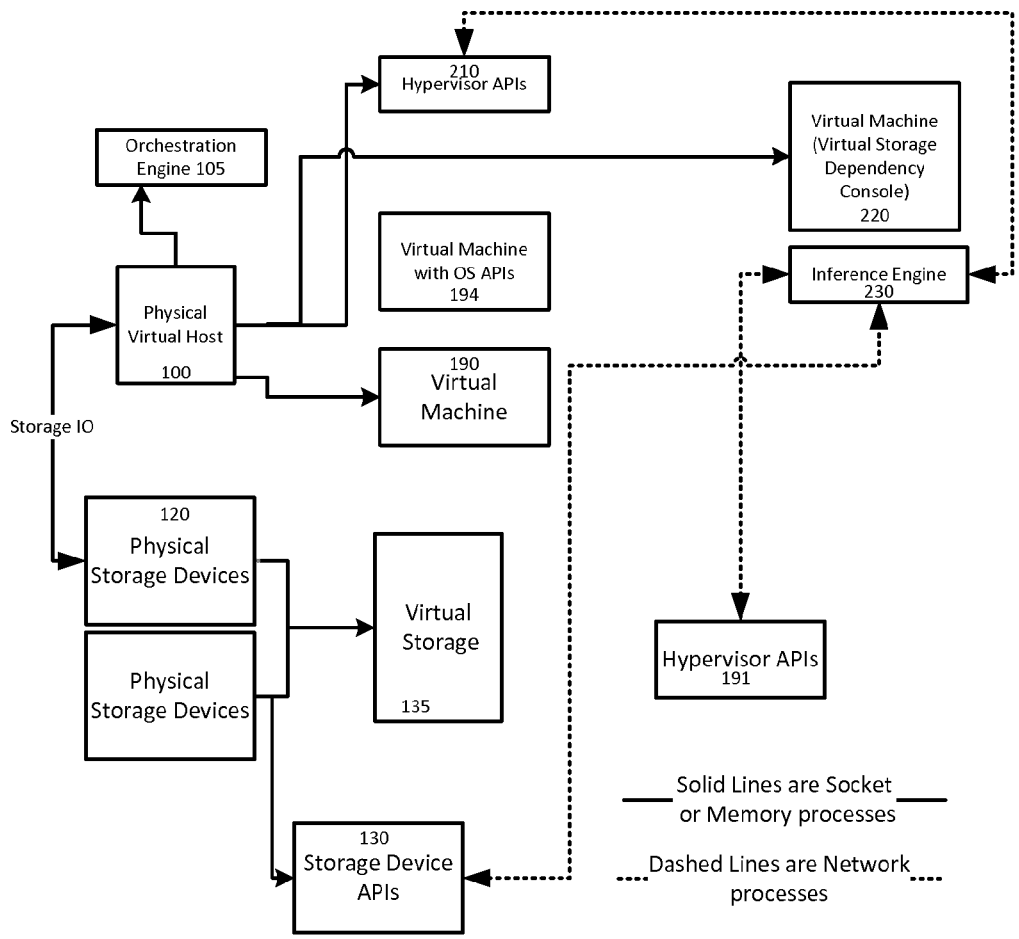
FIG. 1 illustrates a logic diagram of a virtual machine communication interface of a virtual storage configuration.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present disclosure provide a system, method and/or device configured to perform the dynamic creating and provisioning of virtual hard disks (VHDs). Automatically creating a VHD may be achieved by auditing the available storage accessible to the virtual infrastructure. Determining the amount of available storage may be performed by utilizing a query engine to request the physical logical unit number (LUN) that is designated for a particular virtual machine(s) among the virtual infrastructure. The query engine requests and processes the LUN connectivity to the available host's associated with each available hypervisor. In response, the virtual machine information is transmitted to the query engine which forwards the information to an inference engine. The query engine may establish a VIX API connection to observe the status of the allocated storage in use by the hosts in the environment. The data received provides the inference engine with a basis for the creation of new VHDs.

In computer storage, a logical unit number or LUN is a number used to identify a logical unit, which is a device addressed by the small computer systems interface (SCSI) protocol or similar protocols such as Fibre-Channel or Internet SCSI (iSCSI). A LUN may be used with any device which supports read/write operations, such as a tape drive, but is most often used to refer to a logical disk as created on a storage access network (SAN). Though not technically correct, the term "LUN" is often also used to refer to the drive itself.

FIG. 1 illustrates a logic diagram of a virtual machine communication interface of a virtual storage configuration. Referring to FIG. 1, a physical virtual host 100 provides a hypervisor computing function. In computing, a hypervisor, also called a virtual machine manager (VMM), is one of many hardware virtualization techniques allowing multiple operating systems, termed guests, to run concurrently on a host computer device. The very term "hypervisor" is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are very commonly installed on server hardware, with the function of running guest operating systems, that themselves act as servers.

According to one example, if a host operating in the enterprise environment sends a critical storage alert message to the virtual infrastructure provider indicating that a pre-determined threshold of storage usage has been exceeded (i.e., 90% or greater), then the system may send a message to the provider to instantiate a VHD allocation. The size of the VHD allocation may be anywhere between 2 and 4 times the difference between 90% or greater and the full 100% allocation amount. A maximum VHD size may be 40% of the storage allocation to the physical host of the hypervisor. The VHD is provisioned dynamically to the host utilizing the virtual infrastructure providers API for storage instantiation. The VHD may be a logical partition in the physical storage devices 120 that is identified as used by the virtual machine 190.

Example embodiments of the present invention may include an enterprise environment that includes at least one physical virtual host 100, a network device, such as a virtual router capable of virtual networking, as well as physical routers capable of providing network access to the physical network infrastructure (not shown). Other components may include at least one physical storage device 120 capable of provisioning access to a virtual infrastructure comprised of physical hosts and virtual guests that utilize virtual storage such as a virtual machine file system (VMFS). An orchestration engine 105 may be used to dictate the operations of the rules engine (inside the virtual host) and the physical virtual host.

The application components utilized by the virtual storage creation and provisioning system may include a hypervisor management platform such as a VMWare ESX server. VMWare vSphere management software, Microsoft Hyper V, Microsoft SCVMM, Microsoft 2008 Server, Virtual Storage Vendor's API 120, a database such as SQL Server and/or Oracle, a web based virtual machine console server 220 and an inference engine 230.

The inference engine 230 may operate an inference tool, such as "OpenRules", which initiates a process by requesting the enterprise virtualization information from the various APIs reflected in the architecture in FIG. 1. The interface is utilized by the system to provide both data and control input and output for the system. By using this type of interface the system may be distributed within an enterprise or external cloud environment. The inference engine 230 then requests and processes the LUN connectivity to the available guest virtual machine APIs 194 associated with each available hypervisor API 210. The APIs return the active virtual machines and their present virtual storage connectivity allocation both allocated and actual usage.

The hypervisor APIs 191 may provide a detailed list of the virtual machines associated with a virtual environment, their corresponding hosts, resource allocation, network configuration, storage device API configuration 130, and a feature contained within the virtual infrastructure for distribution of instructions for the virtual machine's operating system 194 to provide dynamic network connectivity of the virtual machines to other virtual and physical machines operating in the virtual environment of the enterprise network.

The information may be requested through the OS API of the VIX from the host 100 by the host's API at a default time interval of once every 5 minutes. This default setting is established to provide accurate updates without impacting the performance of the virtual environment. The inference engine 230 established a VIX API connection to observe the status of the allocated storage in use by the hosts operating in the enterprise environment. This data provides the inference engine 230 with a basis for the creation of new VHDs. If a HOST in the enterprise environment sends a critical storage alert to the inference engine 230 of 90% or greater storage utilization, then the inference engine 230 transmits a message to the provider to create a new VHD allocation of two to four times the size of the difference between 90% or greater and 100% total allocated storage utilization. A maximum VHD size therefore is 40% of the storage allocation to the physical host of the hypervisor. The virtual storage device(s) 120 is provisioned dynamically to the host utilizing the virtual infrastructure providers API for storage instantiation.

The hypervisor operating as part of the physical virtual host 100 is queried by a query engine as part of a remote network device, which connects via a network message request (HTTP) to the hypervisor API interface 210. The query engine may perform a query, for example, and receive the following result :fc.5001438005685fb7: 5001438005685fb6-fc. 5006048c536915af: 5006048c536915af-naa.60060480000290301014533030303130; UID: fc.5001438005685fb7:5001438005685fb6-fc.5006048c536915af:5006048c536915af-naa.60060480000290301014533030303130;
Runtime Name: vmhbal:C0:T0:L0;
Device: naa.60060480000290301014533030303130;
Device Display Name: EMC Fibre Channel Disk (naa.60060480000290301014533030303130);
Adapter: vmhba1;
Channel: 0;
Target: 0;
LUN: 0;
Plugin: NMP;
State: active;
Transport: fc;
Adapter Identifier: fc.5001438005685fb7: 5001438005685fb6;

Target Identifier: fc.5006048c536915af:5006048c536915af;
Adapter Transport Details: WWNN: 50:01:43:80:05:68:5f:
b7 WWPN: 50:01:43:80:05:68:5f:b6; and
Target Transport Details: WWNN: 50:06:04:8c:53:69:15:af
WWPN: 50:06:04:8c:53:69:15:af.

In operation, the hypervisor API 210 checks the "State" for the LUN. The state may be identified by a "Run Time Name" and "Device Display Name." The VIX API permits the capability to write programs and scripts to automate virtual machine operations and run programs that manipulate files within guest operating systems. VIX programs run on Windows or Linux and support management of VMware Workstation, Player, and ESX/ESXi, optionally through vCenter. Bindings may be provided for C, Perl, and COM (Visual Basic, VBscript, C#). Virtual hard disk (VHD) is a file format which represents a virtual hard disk drive (HDD). It may contain what is found on a physical HDD, such as disk partitions and a file system, which in turn can contain files and folders. It is typically used as the hard disk of a virtual machine.

According to one example, if 92% of a memory utilization is utilized the file system will create a new VHD with a size of 8% (difference between 92% and 100%) times 4 which is equal to 32%. This is based on controlled observations utilizing a series of prototypes to determine the most efficient sizing that will not require a new VHD be spun up. If a physical disk of the storage device 120 is equal to 5 terabytes, and the LUN virtual storage 135 is 100 Gigabytes, then the VHD would not exceed 40 Gigabytes.

Inference engine 230 may utilize a 'Drools' function, which is an object-oriented rule engine for JAVE. Drools is an augmented implementation of Forgy's Rete algorithm tailored for the Java language. Adapting the Rete algorithm to an object-oriented interface allows for more natural expression of business rules with regards to business objects. Drools provides for declarative logic programming and is flexible enough to match the semantics of problems in an enterprise. The various parts that compose a rule may be extended to lend domain-specific sense to the rule.

Figure 2:
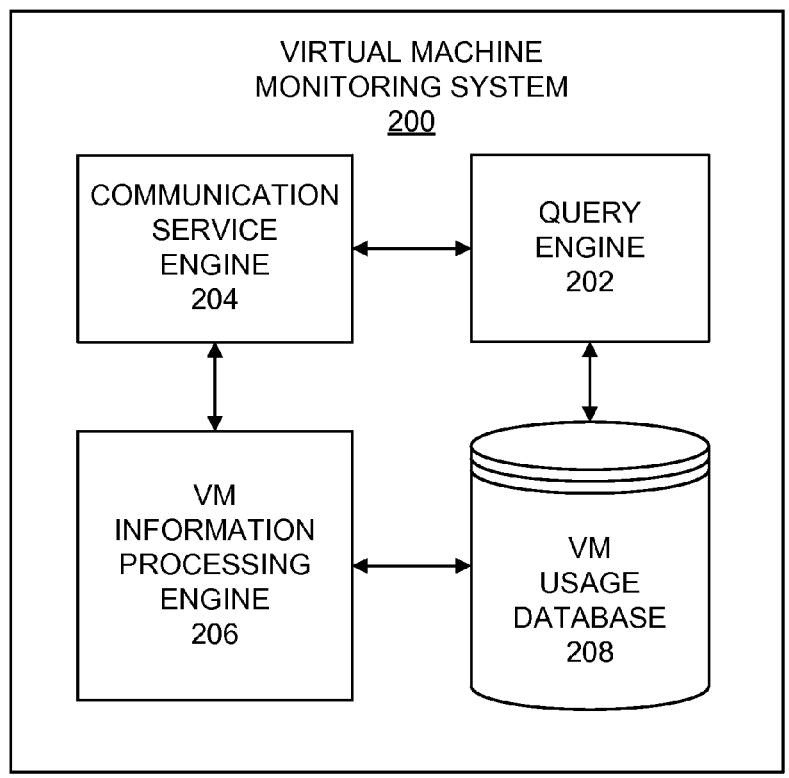
FIG. 2 illustrates an example virtual machine system configured to perform various operations associated with the example embodiments.

FIG. 2 illustrates an example virtual machine monitoring system configured to perform various operations associated with the example embodiments. Referring to FIG. 2 the system 200 may provide a method of identifying a virtual machine memory storage allocation in an enterprise network. The VM usage database 208 may store allocation percentages and actual memory available for allocation purposes to one or more VMs operating in the enterprise environment. A query engine 202 may transmit a storage request to the database 208 to determine an amount of physical memory storage available in an enterprise network. The physical memory storage available may be the difference between the actual total memory capacity and the amount of logically and/or physically allocated memory available. A communication engine 204 may receive an alert message indicating at least one virtual machine currently operating has exceeded a predetermined memory storage threshold value. The threshold may be set at a relatively high level of usage (i.e., 75%, 80%, 90%, etc.). A VM information processing engine 206 may create at least one new virtual hard disk (VHD) to accommodate the exceeded predetermined memory storage threshold value. If more VHDs are needed they may be created as well. The VHD may utilize local storage capacity, remote storage capacity (i.e., cloud storage) and a combination of both local and remote storage in an effort to reallocate the total storage capacity for the currently operating VMs.

The storage level request may include a request for a logical unit number (LUN) available to the at least one virtual machine currently operating in the enterprise network. The amount of physical memory storage available is based on an amount of physical memory storage that is not allocated to any of the virtual machines currently operating in the enterprise network. The physical memory storage allocated to the at least one new VHD is equal to an integer multiple of the difference between the amount of physical memory storage available and 100 percent of the physical memory storage available. According to certain examples, the integer multiple may be equal to 4 or 2 or any other integer value that provides a simple basis for creating a new memory or storage allocation. All the communications conducted between the monitoring system and the VMs may be communicated over an established application programming interface (API).

Example embodiments are preferably realized in a hardware device, such as, a computer, cellular phone, or other mobile terminal device, etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components of the other figures.

Figure 3:
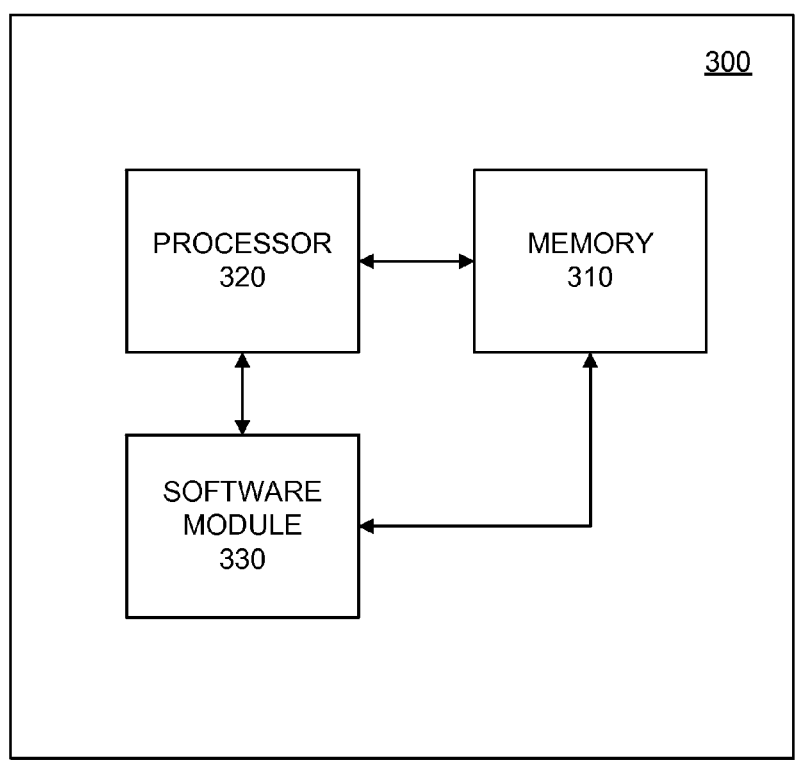
FIG. 3 illustrates an example network entity configured to store instructions and processing hardware for performing operations according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
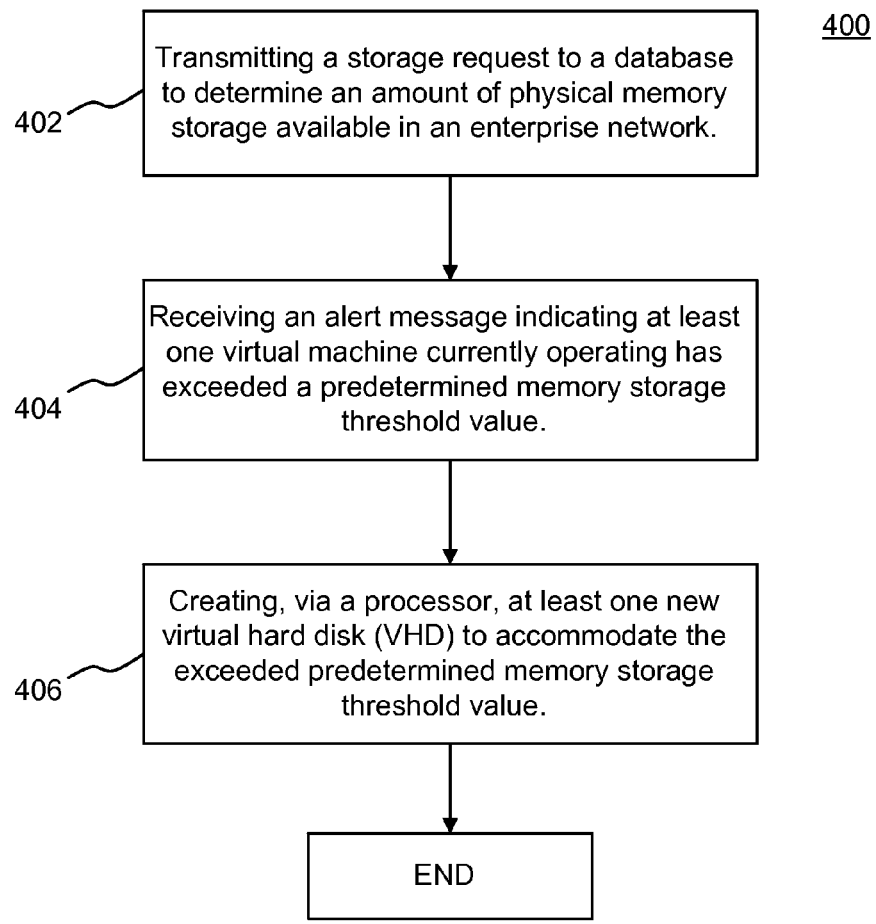
FIG. 4 illustrates an example flow diagram of a method of operation according to example embodiments of the present invention.

FIG. 4 illustrates an example method of operation according to example embodiments. Referring to FIG. 4, the flow diagram 400 includes certain operations for communicating with a VM and monitoring its storage memory usage. The method may include transmitting a storage request to a database to determine an amount of physical memory storage available in an enterprise network, at operation 402. The method may also include receiving an alert message indicating at least one virtual machine currently operating has exceeded a predetermined memory storage threshold value, at operation 404 and creating, via a processor, at least one new virtual hard disk (VHD) to accommodate the exceeded predetermined memory storage threshold value, at operation 406.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems of FIGS. 1 and 2 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A method, comprising:
   receiving a request at a database to determine an amount of available physical memory storage;
   receiving an alert message indicating at least one virtual machine currently operating has exceeded a predetermined memory storage threshold value;
   identifying a percentage of total available physical memory storage by which the at least one virtual machine has exceeded the predetermined memory storage threshold value;
   determining an amount of memory for at least one new virtual hard disk as the percentage of total available physical memory storage;
   creating, via a processor, the at least one new virtual hard disk (VHD) to accommodate the exceeded predetermined memory storage threshold value; and
   allocating the physical memory storage to the at least one new VHD that is equal to an integer multiple of a difference between the amount of physical memory storage available and 100 percent of the physical memory storage available;
   wherein the request and the alert message are communicated over an established application programming interface (API).

2. The method of claim 1, wherein the storage level request comprises a request for a logical unit number (LUN) available to the at least one virtual machine currently operating.

3. The method of claim 1, wherein the amount of physical memory storage available is based on an amount of physical memory storage that is not allocated to any of the virtual machines currently operating.

4. The method of claim 1, wherein the request is received at the database at a predefined time interval.

5. The method of claim 1, wherein the integer multiple is equal to 4.

6. The method of claim 1, wherein the integer multiple is equal to 2.

7. An apparatus, comprising:
   a receiver configured to receive:
      an alert message indicating at least one virtual machine currently operating has exceeded a predetermined memory storage threshold value;
      at a predefined time interval a request at a database to determine an amount of available physical memory storage; and
   a processor configured to:
   identify a percentage of total available physical memory storage by which the at least one virtual machine has exceeded the predetermined memory storage threshold value;
   determine an amount of memory for at least one new virtual hard disk as the percentage of total available physical memory storage;
   create the at least one new virtual hard disk (VHD) to accommodate the exceeded predetermined memory storage threshold value; and
   allocate the physical memory storage to the at least one new VHD that is equal to an integer multiple of a difference between the amount of physical memory storage available and 100 percent of the physical memory storage available;
   wherein the request and the alert message are communicated over an established application programming interface (API).

8. The apparatus of claim 7, wherein the storage level request comprises a request for a logical unit number (LUN) available to the at least one virtual machine that currently operates.

9. The apparatus of claim 7, wherein the amount of physical memory storage available is based on an amount of physical memory storage that is not allocated to any of the virtual machines that currently operates.

10. The apparatus of claim 7, wherein the request is received at the database at a predefined time interval.

11. The apparatus of claim 7, wherein the integer multiple is equal to 4.

12. The apparatus of claim 7, wherein the integer multiple is equal to 2.

13. A non-transitory computer readable storage medium configured to store instructions that when executed cause a processor to perform:
- receiving at a predefined time interval a request at a database to determine an amount of available physical memory storage;
- receiving an alert message indicating at least one virtual machine currently operating has exceeded a predetermined memory storage threshold value;
- identifying a percentage of total available physical memory storage by which the at least one virtual machine has exceeded the predetermined memory storage threshold value;
- determining an amount of memory for at least one new virtual hard disk as the percentage of total available physical memory storage;
- creating the at least one new virtual hard disk (VHD) to accommodate the exceeded predetermined memory storage threshold value; and
- allocating the physical memory storage to the at least one new VHD that is equal to an integer multiple of a difference between the amount of physical memory storage available and 100 percent of the physical memory storage available;
- wherein the request and the alert message are communicated over an established application programming interface (API).

14. The non-transitory computer readable storage medium of claim 13, wherein the storage level request comprises a request for a logical unit number (LUN) available to the virtual machines currently operating.

15. The non-transitory computer readable storage medium of claim 13, wherein the amount of physical memory storage available is based on an amount of physical memory storage that is not allocated to any of the virtual machines currently operating.

16. The non-transitory computer readable storage medium of claim 13, wherein the request is received at the database at a predefined time interval.

17. The non-transitory computer readable storage medium of claim 13, wherein the integer multiple is equal to 4.

18. The non-transitory computer readable storage medium of claim 13, wherein the integer multiple is equal to 2.

* * * * *